(12) United States Patent
Plietsch

(10) Patent No.: US 6,739,405 B2
(45) Date of Patent: May 25, 2004

(54) HAMMER

(75) Inventor: Reinhard Plietsch, Brechen (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/043,720

(22) Filed: Jan. 10, 2002

(65) Prior Publication Data

US 2002/0088627 A1 Jul. 11, 2002

(51) Int. Cl.[7] .............................................. B25D 17/00
(52) U.S. Cl. ..................... 173/201; 173/104; 173/109; 173/49
(58) Field of Search ............................ 173/47, 48, 49, 173/104, 109, 201, 142

(56) References Cited

U.S. PATENT DOCUMENTS

| | | | | |
|---|---|---|---|---|
| 3,160,217 A | * | 12/1964 | Raihle | 173/94 |
| 3,161,242 A | * | 12/1964 | Etzkorn et al. | 173/109 |
| 3,269,466 A | * | 8/1966 | Mitchell | 173/93.6 |
| 3,305,031 A | * | 2/1967 | Bez et al. | 173/115 |
| 3,507,337 A | * | 4/1970 | Chromy | 173/14 |
| 3,996,823 A |   | 12/1976 | Guillermier |  |
| 4,567,951 A | * | 2/1986 | Fehrle et al. | 173/201 |
| 4,585,078 A |   | 4/1986 | Alexandrov et al. |  |
| 5,337,835 A | * | 8/1994 | Bohne et al. | 173/13 |
| 5,379,848 A | * | 1/1995 | Rauser | 173/48 |
| 6,015,017 A | * | 1/2000 | Lauterwald | 173/48 |
| 6,112,830 A | * | 9/2000 | Ziegler et al. | 173/109 |

* cited by examiner

Primary Examiner—Scott A. Smith
Assistant Examiner—Nathaniel Chukwurah
(74) Attorney, Agent, or Firm—Michael P. Leary; Bruce S. Shapiro; Charles E. Yocum

(57) ABSTRACT

A motor driven hammer comprising a tool holder and an air cushion hammering mechanism including a piston and a beat piece slideably located in a cylinder wherein reciprocation of the piston in the cylinder will cause the beat piece to hit a tool located in the tool holder, and further comprising an eccentric mass mounted for rotation about the axis of the cylinder and rotatingly driven by the motor via a gear arrangement so as to cause the bit mounted in the tool holder to be laterally diverted.

8 Claims, 2 Drawing Sheets

HAMMER

BACKGROUND OF INVENTION

This invention relates to motor driven hammers, and, in particular to hammers that incorporate an air cushion hammering mechanism.

Such hammers will normally include a tool holder that can hold a hammer bit or chisel bit for acting on a workpiece, and an air cushion hammering mechanism which comprises a piston, a ram and a beat piece that are slidably located in a cylinder so that reciprocation of the piston in the cylinder will be transferred to the beatpiece via the ram and cause the beat piece to repeatedly hit a bit located in the tool holder. Some such hammers may have more than one mode. For example a hammer may be capable of being employed in a hammer only or so-called "chiselling" mode in which the piston reciprocates within the cylinder in order to cause the beat piece to hit the bit without any rotation of the tool, or alternatively a drilling only mode in which the cylinder may form part of a spindle connected to the tool holder and is caused to rotate about the piston, thereby causing the bit inserted in the tool holder to rotate. The hammer may also be capable of being employed in a combination rotary hammer mode in which the piston reciprocates within the cylinder causing the beat piece to hit the bit while at the same time the cylinder rotates about its axis, thereby causing the bit to rotate.

One problem with such hammers, when they are hammering a hole into an object, such as a piece of concrete, is that the dust generated by the hammering action can remain in the hole and reduce the efficiency of the hammering action.

SUMMARY OF INVENTION

According to the present invention there is provided a motor driven hammer which comprises: a hammer housing having a forward end, a cylinder mounted within the hammer housing, a tool holder located at the forward end of the hammer housing forwardly of the cylinder in which tool holder a bit may be releaseably mounted, an air cushion hammering mechanism located in the cylinder for repeatedly impacting a bit mounted in the tool holder, and an eccentric mass, that is an unbalanced mass, mounted for rotation about the axis of the cylinder which can be rotatingly driven so as to cause a bit mounted in the tool holder to be laterally diverted.

The rotation of the eccentric mass will impart a transverse (as opposed to longitudinal) vibration to the hammer and, thus, cause the working end of a bit mounted within the tool holder of the hammer (ie. the end of the bit remote from the tool holder) to tend to follow a circular path. This vibration induced tendency to move or "walk" will be restricted by the structure of the material then being hammered by the bit. The resulting lateral movement of the bit within the material then being hammered is effective to remove dust from the hole and maintain the contact of the tool bit with the unbroken portions of the workpiece. This will improve the performance of the hammer.

In a preferred embodiment of the hammer a sleeve is rotatably mounted on the cylinder which sleeve carries the eccentric mass in an unbalanced manner and can be selectively and rotatingly driven about the cylinder.

The hammering mechanism may comprise a piston, a ram and a beatpiece which are slideably located within the cylinder so that reciprocation of the piston in the cylinder causes the beatpiece to reciprocate and to repeatedly hit a bit located in the tool holder. The hammer may be a rotary hammer that additionally comprises means for causing the cylinder and/or tool holder to rotate in order to cause a bit located in the tool holder to rotate.

In a hammer having a chiselling (hammer only) mode of operation and at least one mode of operation in which the cylinder and/or tool holder is rotatingly driven in order to rotatingly drive a bit mounted in the tool holder, it is preferred that a coupling element is arranged to couple rotary drive to the eccentric mass in the chiselling mode of operation and to decouple rotary drive to the eccentric mass in the modes of operation in which the cylinder and/or tool holder is rotatingly driven.

BRIEF DESCRIPTION OF DRAWINGS

One form of rotary hammer according to the present invention will now be described by way of example with reference to the accompanying drawings in which.

DETAILED DESCRIPTION OF INVENTION

Figure 1:
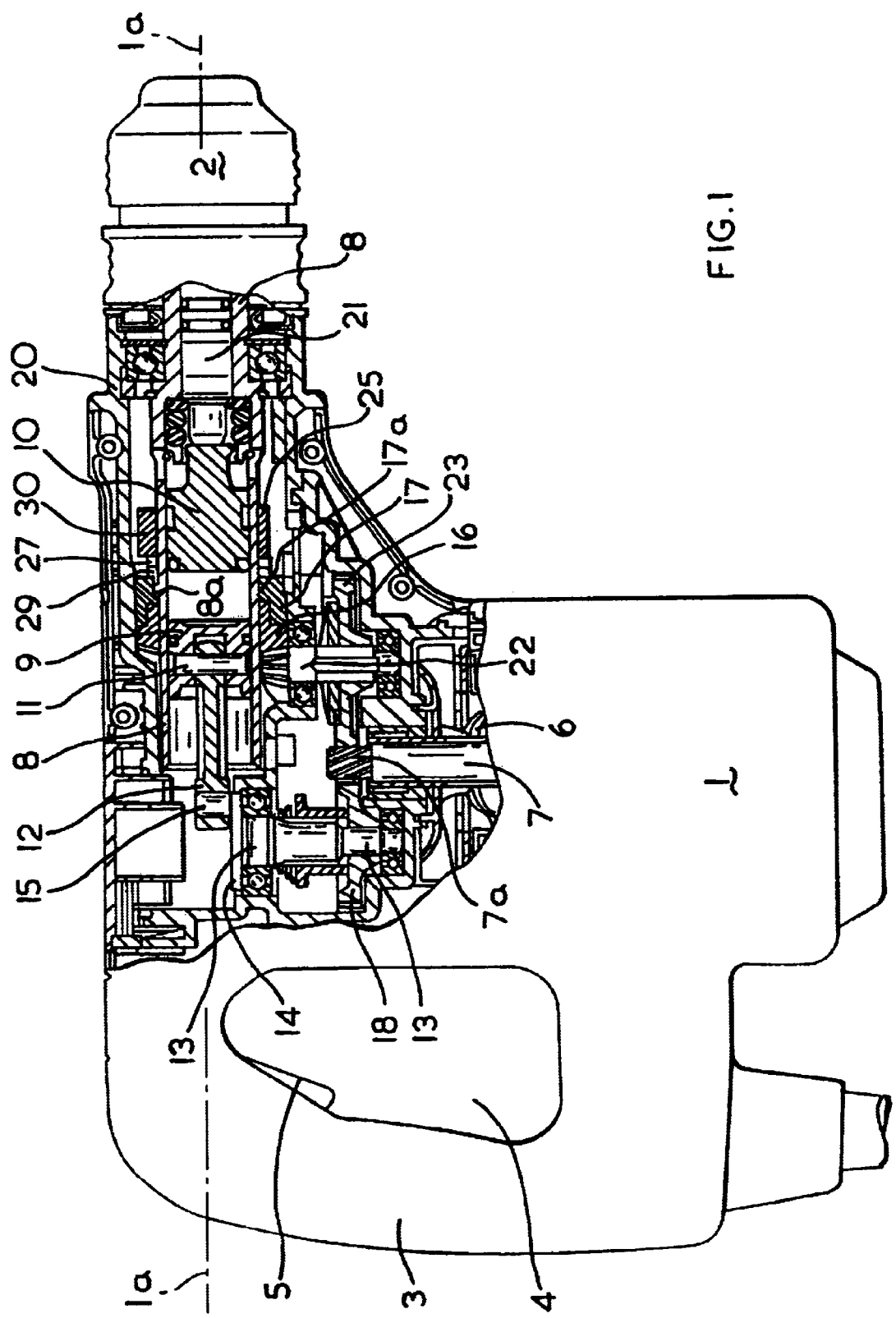
FIG. 1 is a partial cutaway view of a hammer according to the present invention.
Figure 2:
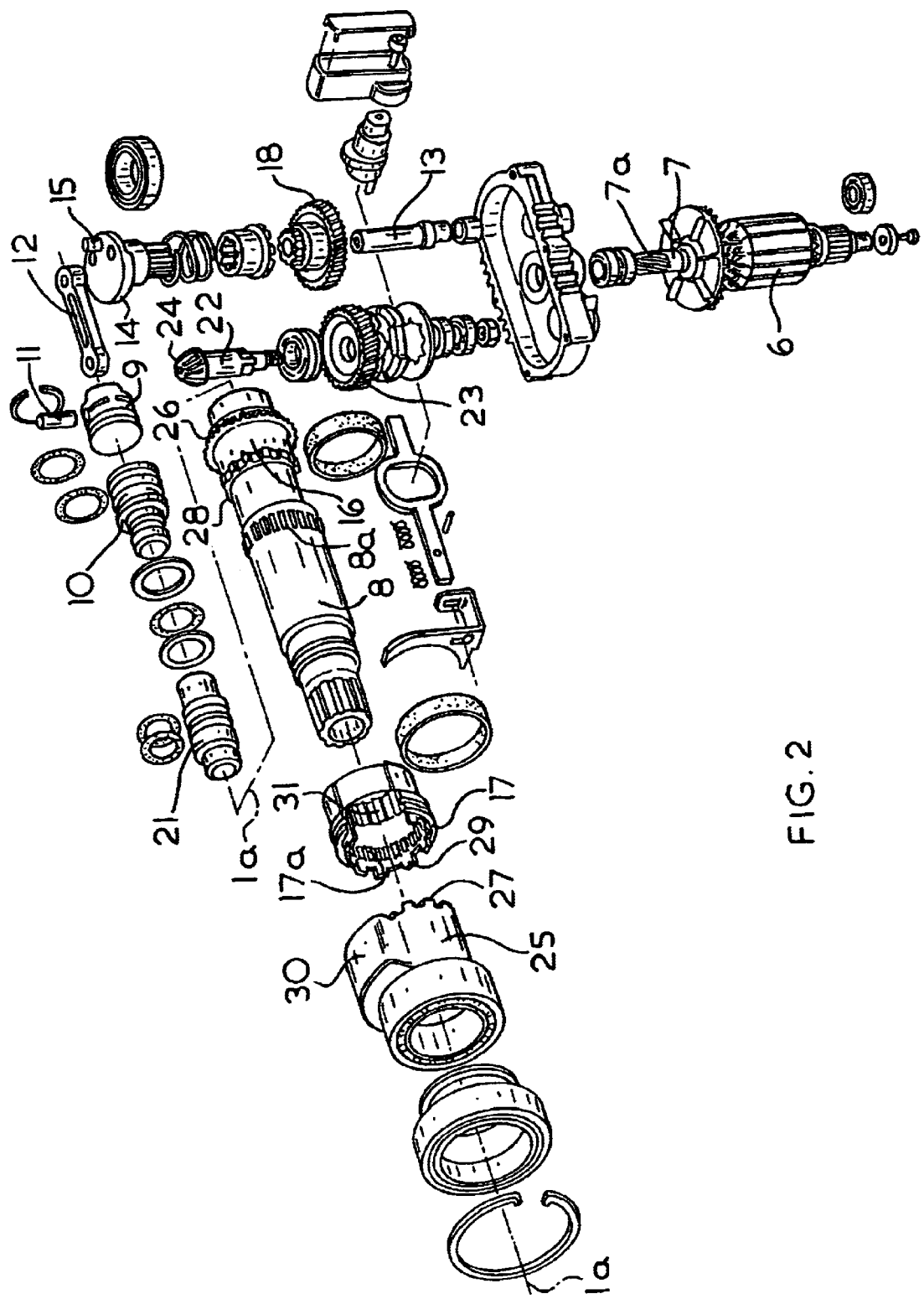
FIG. 2 is an exploded view of some of the components of the hammer of FIG. 1

Referring to the accompanying drawings, the rotary hammer is comprised in the usual way of several components, including a hammer housing 1 having a working axis 1a. Housing 1 includes a gripping portion 3 at its rear end, so that a switch actuator 5 for switching an electric motor 6 on and off projects into a grip opening 4 which is defined at its rear side by the gripping portion 3. In the rear lower portion of the hammer housing 1, a mains lead, not shown, which serves to connect the rotary hammer to a power source, is led out.

Located in the upper portion of the rotary hammer in FIG. 1 is an inner housing 20, preferably formed of half-shells and made from cast aluminium or the like, which extends forwards out of the rotary hammer housing 1 and in which a hammer spindle 8 is rotatably mounted. The rear end of the spindle 8 forms the guide tube or cylinder, provided in the known manner, for a pneumatic or air cushion hammer mechanism. A tool holder assembly 2 is mounted at the front end of spindle 8. The hammer mechanism comprises a piston 9. The piston 9 is coupled, via a trunnion 11 and a crank arm 12, to a crank pin 15, which sits eccentrically on the upper plate-shaped end 14 of a drive shaft 13.

A reciprocating movement of the piston 9 is carried out to alternately create a vacuum and an over-pressure in an air cushion located between the piston and a ram 10. The alternating pressure causes ram 10 to move within cylinder 8 and impact a beat piece 21, which, in turn, strikes the rear end of a hammer bit or chisel bit, not represented, which is inserted into the tool holder 2. This mode of operation and the structure of a pneumatic or air cushion hammer mechanism are, as already mentioned, known per se.

The electric motor 6 is arranged in the hammer housing 1 in such a way that its armature shaft 7 extends perpendicularly to the longitudinal axis of the hammer spindle 8 and the tool holder 2. Preferably, the longitudinal axis of the armature shaft 7 lies in a common plane with the longitudinal axis of the hammer spindle 8 and tool holder 2. At the upper end of the armature shaft 7 in FIG. 1 a pinion 7a is formed, which meshes with a gear wheel 18 that sits rotatably on the drive shaft 13 for the hammer mechanism. The pinion 7a also meshes with a gear wheel 23, which is arranged on the side of the armature shaft 7 lying opposite the drive shaft 13, and is non-rotatably secured on a shaft 22 rotatably mounted in the housing 1.

To drive the hammer mechanism, the gear wheel 18 is driven by the pinion 7a of the armature shaft 7. Gear wheel 18 is coupled with the drive shaft 13, so that the crank pin 15 performs a circular movement that creates, via the crank arm 12, the reciprocating movement of the piston 9 in the guide tube 8 of the hammer mechanism. This type of drive is well known in those rotary hammers wherein the armature shaft 7 of the drive motor 6 lies perpendicular to the longitudinal axis of the hammer spindle 8 and the tool holder 2.

At the upper end of the shaft 22 a bevel gear 24 is formed, which meshes with the bevel toothing 26 of a drive sleeve 16. Drive sleeve 16 sits rotatably and axially non-displaceably around the hammer spindle 8. The drive sleeve 16 has teeth 28 at its forward end which mesh with teeth 31 formed on the rearward end of an axially slideable mode change sleeve 17. The teeth 28 on the forward end of the drive sleeve 16 and the teeth 31 on the rearward end of the mode change sleeve 17 are always in engagement, regardless of the position of the mode change sleeve. Thus, a rotary driving force is transmitted to the mode change sleeve 17 whenever the hammer is switched on.

Another sleeve 25 is rotatably mounted on the spindle 8 and has rearwardly extending teeth 27 which can be selectively engaged by forwardly extending teeth 29 on the mode change sleeve 17. The sleeve 25 carries an eccentric mass 30. When the teeth 27 and 29 are engaged, the sleeve 25 is rotatingly driven about the spindle 8 by the mode change sleeve 17. The rotation of the sleeve 25 about the spindle 8, causes the eccentric mass 30 to rotate about the axis 1a and the spindle 8, which imparts a vibration to the tool bit held in the tool holder 2. The vibration induced lateral movement of the tool or bit enables dust to escape from a hole being chiselled by the hammer.

The mode change sleeve 17 can be moved between a forward and a rear position. When the mode change sleeve 17 is in its rear position on the spindle 8 (as shown in FIG. 1), the drive sleeve 16 rotatingly drives the spindle 8 via the internal teeth 17a on the mode change sleeve 17, which engage external teeth 8a on the spindle 8. With the mode change sleeve in the rear position rotary hammering occurs. The teeth 27 and 29 are disengaged and so the sleeve 25 carrying the eccentric mass 30 is not rotated.

When the mode change sleeve 17 is in its forward position on the spindle 8, the drive sleeve 16 rotatingly drives the sleeve 25 via the engagement between the forward teeth 29 on the mode change sleeve 17 and the rearward teeth 27 on the sleeve 25. The teeth 17a and 8a are disengaged and so no rotary drive is transmitted to the spindle. With the mode change sleeve 17 in the forward position chiselling occurs and the bit is laterally diverted due to the rotation of the eccentric mass 25 about the spindle 8.

Although described in the context of an electric powered hammer employing an air cushion type hammering mechanism and having an L-shaped configuration (motor axis substantially perpendicular to the tool axis), persons of ordinary skill in the art will recognise that the invention taught here is equally applicable to other hammers and percussion tools employing other well known striking mechanisms and tool configurations.

What is claimed is:

1. A powered hammer for reciprocating a tool bit slidably mounted to said hammer, the hammer comprising:
    a housing having a working axis, and
    an eccentric mass mounted in the housing and rotatably drivable around the working axis, whereby a transverse vibration is imparted to the hammer, which vibration causes the tool bit to be laterally diverted.

2. A powered hammer for reciprocating a tool bit slidably mounted to said hammer, the hammer comprising:
    a housing,
    a hammering mechanism located in the housing for reciprocatingly driving the tool bit, and
    an eccentric mass mounted in the housing and rotatably drivable around a portion of the hammer mechanism, whereby a vibration is imparted to the hammer, which vibration causes the tool bit to be laterally diverted.

3. A powered hammer according to claim 2 wherein the hammering mechanism is an air cushion hammering mechanism.

4. A powered hammer for reciprocating a tool bit slidably mounted to said hammer, the hammer comprising:
    a housing,
    a cylinder mounted within the housing,
        a tool holder connected to one of the housing and the cylinder and in which the tool bit may be slidably mounted for reciprocating motion,
        a hammering mechanism located in the housing for repeatedly impacting the tool bit mounted in the tool holder thereby imparting a reciprocating motion to the tool bit, and
        an eccentric mass mounted in the housing and rotatably drivable around the cylinder, whereby a vibration is imparted to the tool bit, which vibration causes the tool bit to be laterally diverted.

5. A powered hammer according to claim 4 and further comprising a sleeve rotatably mounted around the cylinder, and wherein the eccentric mass is connected to the sleeve and the sleeve is rotatingly drivable about the cylinder.

6. A powered hammer according to claim 4 and further comprising a rotary drive mechanism for causing one of the cylinder and tool holder to rotate whereby the tool bit is rotated.

7. A powered hammer according to claim 6 having a chiselling mode of operation without driven rotation of the tool bit and a second mode of operation in which the tool bit is rotatingly driven, and further comprising a coupling element arranged to selectively couple the rotary drive to the eccentric mass for rotating the eccentric mass in the chiselling mode of operation, and to decouple the rotary drive from the eccentric mass in the mode of operation in which the tool holder is rotatingly driven.

8. A powered hammer according to claim 4 wherein the hammering mechanism includes a piston, a rain and a beatpiece, slideably located within the cylinder and wherein the hammer further comprises a percussion drive mechanism for reciprocatingly driving the piston within the cylinder such that reciprocation of the piston in the cylinder causes the ram to reciprocate and repeatedly impact the beatpiece, which beatpiece repeatedly impacts the bit.

* * * * *